United States Patent [19]

Busboom

[11] Patent Number: 4,545,719
[45] Date of Patent: Oct. 8, 1985

[54] BIFOLDING SHIELD FOR AGRICULTURAL HARVESTER

[75] Inventor: Garry W. Busboom, Independence, Mo.

[73] Assignee: Deutz-Allis Corporation, Milwaukee, Wis.

[21] Appl. No.: 614,531

[22] Filed: May 29, 1984

[51] Int. Cl.$^4$ ............................................. B62D 25/12
[52] U.S. Cl. ................... 414/523; 180/89.17; 160/213; 292/202
[58] Field of Search ............................ 414/505, 523; 180/89.17, 69.21; 160/210, 212, 213; 292/202

[56] References Cited

U.S. PATENT DOCUMENTS 3,754,613 8/1973 Stephens et al. .................. 180/69.21
4,415,052 11/1983 Gauer ............................ 180/89.17 X Primary Examiner—Robert G. Sheridan
Attorney, Agent, or Firm—Charles L. Schwab

[57] ABSTRACT

A self-propelled harvester or combine is provided with a bifolding panel structure at the lateral side thereof on which a bin unloader tube is swingable from an outwardly extending unloading position to a transport position alongside the panel structure. When the unloader tube is in its transport position, the lower part of the panel structure can be pivoted about its pivot connection with the upper part of the panel structure between closed and open positions, but the unloading tube in its transport position prevents opening the upper part of the panel structure. When the unloader tube is raised, the upper part can be moved from its closed to its open position.

A linear air spring or actuator biasingly maintains the lower part of the panel structure in whichever of its open and closed positions it is placed, and when the upper part is swung to its open position, it is maintained in that position by the linear actuator. In an alternate embodiment of the invention, the linear actuator biasingly holds the upper part of the panel in its closed position when placed there.

12 Claims, 10 Drawing Figures

BIFOLDING SHIELD FOR AGRICULTURAL HARVESTER

BACKGROUND OF THE INVENTION

1. Technical Field

This invention relates to a shield for an agricultural harvester and, more particularly, to a bifolding shield having upper and lower panels which are biased to closed and opened positions by a resilient linear actuator.

2. Prior Art

A prior art construction of Allis-Chalmers Corporation is illustrated in FIG. 10 of the drawings. As illustrated, a bifolding shield 201 is provided at one lateral side of an agricultural harvester 202 which includes an upper panel 203 pivotally connected at its upper end to the harvester on a longitudinally horizontal axis 204 and a lower panel 206 which has its upper end pivotally connected to the lower end of the upper panel 203 for pivotal movement about a second longitudinal horizontal axis 207 generally parallel to the first axis 204. The prior art shield also includes a linear resilient gas filled actuator 208 interconnected between the harvester frame 209 and the lower part of the upper panel and so disposed that the actuator maintains the upper panel in its closed position, illustrated in full lines in FIG. 10, when it is moved to that position, and maintains the upper panel in its opened position, illustrated in broken lines 211, when the upper panel occupies that position. A releasable latch mechanism 212 is provided between the lower end of the upper panel 203 and the harvester to releasably secure the upper panel 203 in its closed position. The lower end of the lower panel 206 fits in a channel 213 to releasably maintain the lower end of the lower panel 206 in its closed position.

SUMMARY OF THE INVENTION

The bifolding shield or panel structure of this invention is particularly useful in screening belts and pulleys on the lateral side of a vehicle in the form of an agricultural harvester or combine on which the bin unloader tube is located; although, it could be used on either lateral side of the combine. Typically, the bifolding shield of this invention includes a first upright panel having its upper end pivotally connected to the vehicle for swinging movement in an outboard direction about a first generally horizontal axis between a downwardly extending closed position and an open position wherein its lower end is disposed outwardly away from the vehicle and a second upright panel pivotally connected at its upper end to the lower end of the first panel for relative swinging movement in one direction about a second generally horizontal axis between a closed position in which it extends downwardly from the first panel and an open position in angular relation to the first panel. A resilient linear actuator has one end pivotally connected by pivot means to the vehicle at a first point spaced from the first axis and has its other end pivotally connected by pivot means to the second panel at a second pivot point spaced from the second pivot axis to produce a line of thrust passing near the first axis and on the outboard side of the second axis when the panels are in their closed positions whereby the second panel is biased by the actuator toward its closed position. The second panel is manually swingable from its closed position to its open position wherein the pivot point between the second panel and the other end of the actuator is shifted to a position wherein the line of thrust of the actuator passes on the inboard side of the second axis whereby the second panel is biased toward its open position. The actuator also biases the first panel toward its open position when it is moved to that position.

In one version of the invention the line of thrust of the actuator passes on the outboard side of the first axis when the first panel is closed and, thus, the actuator resiliently biases the first panel towards its closed position when placed in that position.

A manually operable latch may be used between the vehicle and the first panel to releasably secure it in its closed position. Interlock means may be included to prevent the latch from being released when the second panel is in its closed position and releasable latches may also be used to hold the second panel in its closed position.

When the bifolding shield is used on the side of a combine having a bin unloading tube disposed alongside the upper panel in its transport position, the lower panel can be opened to service drive components etc. behind the second panel without moving the upper panel. Upon swinging the unloading tube upwardly to its unloading position, the upper panel can be opened to gain access to operating components above the lower panel.

It is an object of the present invention to provide an improved bifolding shield arrangement having upper and lower panels resiliently held in open and closed positions by a single linear gas actuator.

BRIEF DESCRIPTION OF THE DRAWINGS

The invention is illustrated by the drawings in which:

FIG. 4 is an enlarged view showing the latch for maintaining the upper part of the bifolding shield in its closed position;

FIG. 5 is a view taken on the line V—V in FIG. 4;

FIG. 6 is a view taken on the line VI—VI in FIG. 2;

FIG. 7 is a view taken on the line VII—VII in FIG. 2;

DETAILED DESCRIPTION OF THE DRAWINGS

Figure 1:
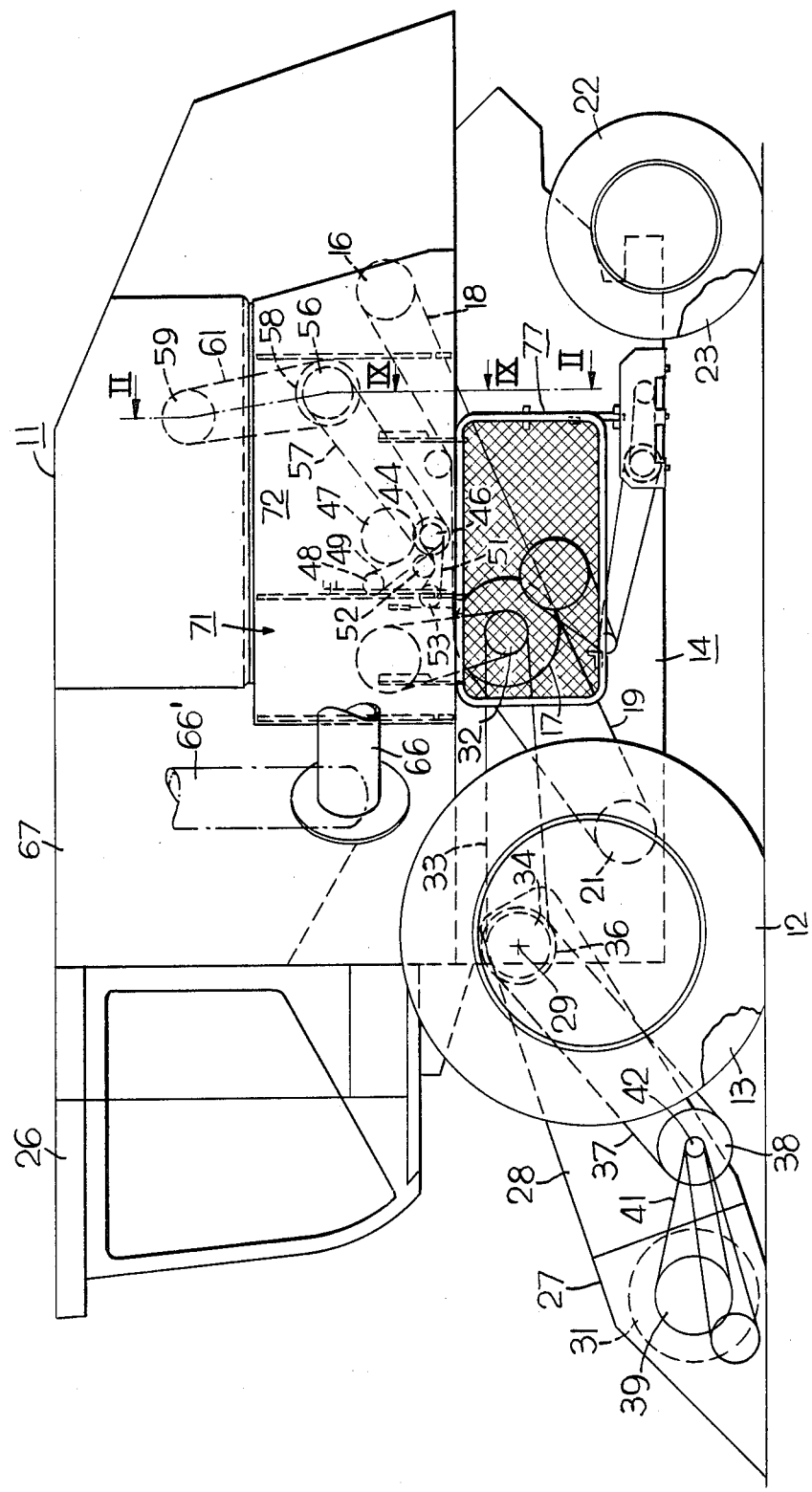
FIG. 1 is a side view of a self-propelled vehicle in the form of an agricultural harvester or combine incorporating the present invention.
Figure 2:
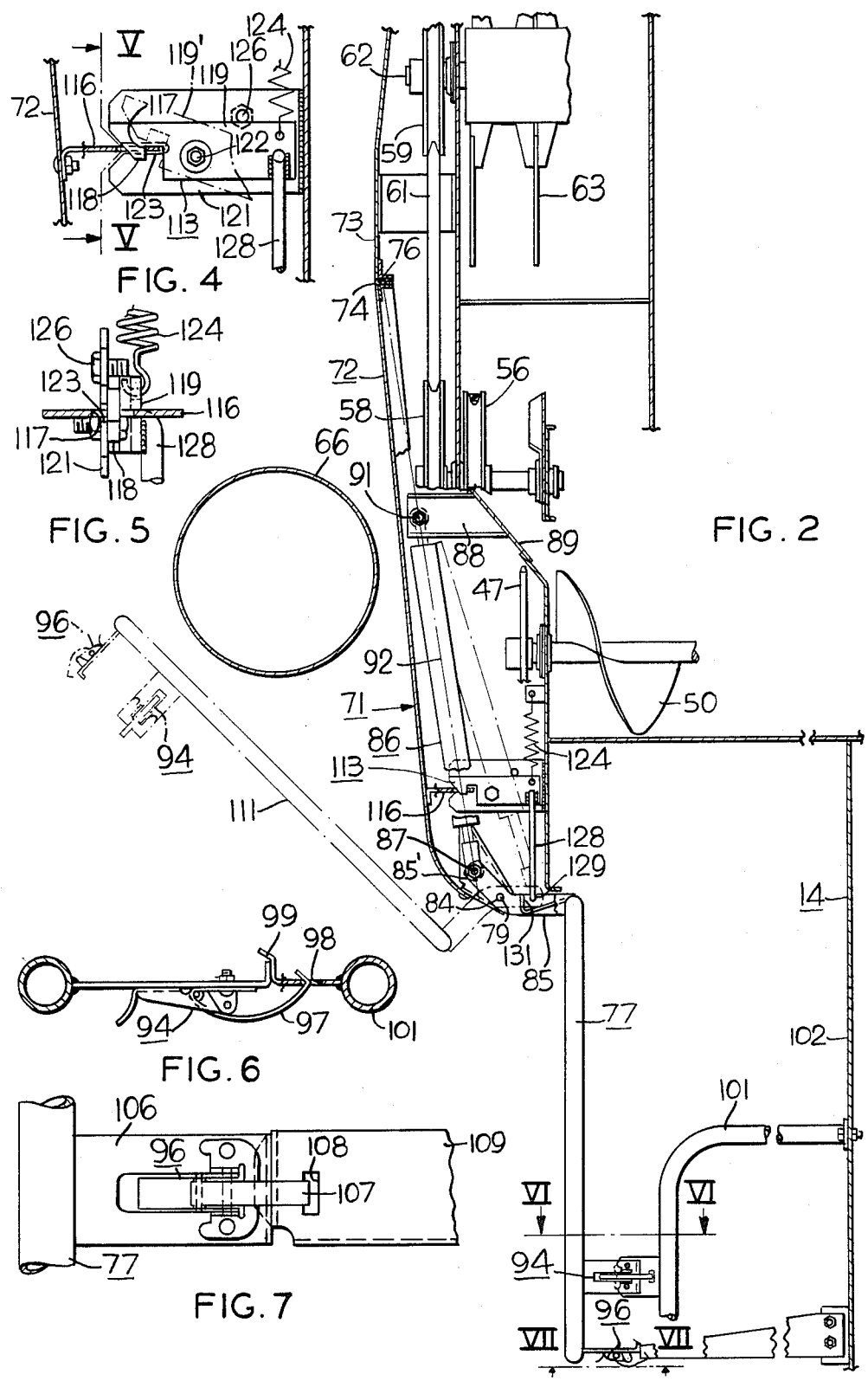
FIG. 2 is a view taken on the line II—II in FIG. 1.

Referring to FIG. 1, a self-propelled vehicle in the form of an agricultural harvester or combine 11 includes a pair of drive wheels 12, 13 supporting the front of a frame 14 which are driven by an engine, not shown. Various power transmitting belts and pulleys are located on the left-hand side of the combine, as seen in FIG. 1. A pulley 16 driven by an engine, not shown, drives a pulley 17 through an endless belt 18 and the pulley 17 through appropriate torque transmitting means drives a coaxial pulley, not shown, which is engaged by an endless belt 19. The endless belt 19 drives a pulley 21 which in turn drives an input shaft of a transmission mechanism, not shown, whose output shaft is connected to the drive wheels 12, 13 by means, not shown. The rear of the combine frame 14 is supported by a pair of steerable wheels 22, 23. An operator's station or cab 26 is provided at the front of the combine elevated above the header 27 whose feeder conveyor 28 is pivotally connected to the frame 14 of the combine on a transverse pivot axis 29. A pulley 32 drives an endless belt 33 which is reeved about the pulley 34 coaxial with the axis 29. The pulley 34 is connected through appropriate torque transmitting means, not shown, to a pulley 36 about which a drive belt 37 is reeved. The drive belt 37 is also reeved about a pulley 38 which in turn drives a sprocket 39 on a header auger 31 through a drive chain 41 reeved about sprocket 39 and a sprocket 42 coaxial with pulley 38. A pulley 44 is connected to a transverse shaft of an accelerator roll, not shown, which shaft also carries a sprocket 46. The sprocket 46 drives a sprocket 47 secured to the shaft of a distribution auger 50, shown in FIG. 2, through a drive chain 49 engaging the sprockets 46, 47 and the idler sprocket 48. Another sprocket, not shown, concentric with sprocket 46 drives a chain 51 which engages a sprocket 52 on the shaft of a second accelerator roll, not shown, and also engages an idler sprocket 53. The pulley 44 is drivingly connected to a pulley 56 through an endless drive belt 57 and a pulley 58, connected concentrically with pulley 56 by torque transmitting means, not shown, drives a pulley 59 through a drive belt 61. As shown in FIG. 2, the pulley 59 is secured to a shaft 62 of a discharge impeller chopper 63. An unloading tube 66 is connected to the left-hand side of the combine at the bottom of the grain bin 67 for swiveling movement between its full line illustrated transport position to an upwardly and outwardly extending bin unloading position as shown by broken lines 66'.

Figures 3, 8, 9:
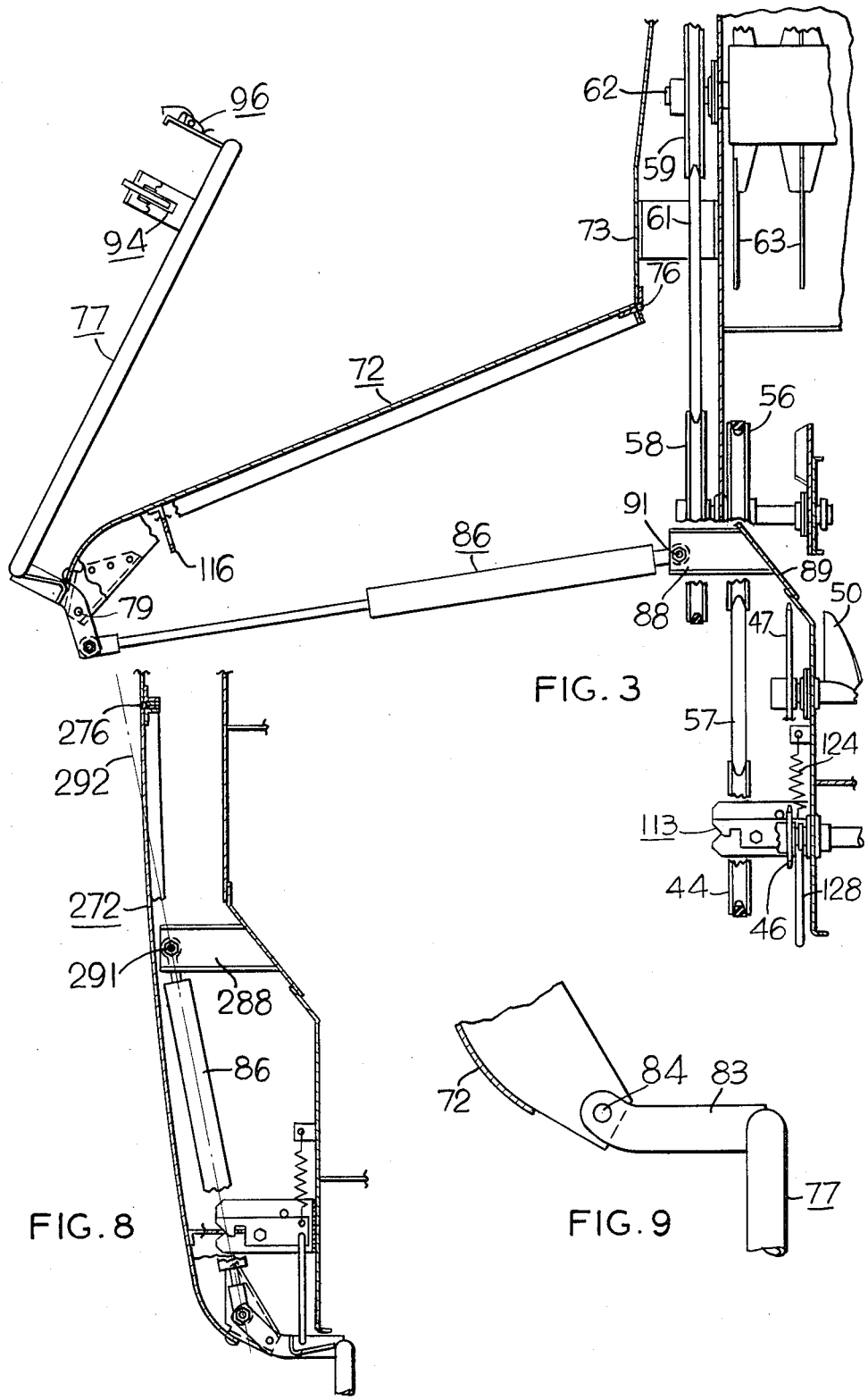
FIG. 3 is a view similar to FIG. 2 but showing the bifolding shield in its opened position.
FIG. 8 is a view showing a second embodiment of the present invention.
FIG. 9 is a view taken on the line IX—IX in FIG. 1.

Some of the belts and pulleys on the left-hand side of the combine, as viewed in FIG. 1, are shielded by a bifolding shield or side panel structure 71. The panel structure 71 includes an upper upright panel 72 pivotally connected at its upper end by a hinge structure 74 to a side wall panel 73 for swinging movement in an outboard direction about a longitudinal horizontal axis 76 from a downwardly extending closed position, as illustrated in FIGS. 1 and 2, to an open position as illustrated in FIG. 3. The side panel structure or shield 71 includes a lower upright panel in the form of a screen 77 which is pivotally connected at its upper end to the lower end of the upper panel 72 for swinging movement about a longitudinal horizontal axis 79 generally parallel to axis 76. Referring also to FIG. 9, the pivotal connection between the upper and lower panels is provided by three aligned pivot pins 84 pivotally connecting brackets on the lower part of the upper panel 72 with two short brackets 83 and a long bracket 85 welded to the top of the lower panel 77. One of the short brackets 83 is shown in FIG. 9. The long bracket 85 has a leg portion 85' extending upwardly and outwardly from the pivot pin 84, as viewed in FIG. 2, showing the lower panel 77 in its closed position. The free end of the bracket 85 is pivotally connected to the lower end of a resilient linear actuator 86 in the form of an extensible and contractible compressed gas spring at a pivot point 87. The upper end of the linear actuator 86 is pivotally connected to a bracket 88 on the side wall 89 of the combine 11 at a pivot point 91. In the closed position of the upper and lower panels 72, 77, the line of thrust 92 represented by broken line 92 passes near but slightly inboard of the pivot axis 76 and passes on the outboard side of pivot axis 79. Thus, when the panels 72, 77 are in their closed position, as illustrated in solid lines in FIG. 2, the linear actuator 86 on the inboard side of the shield 71 serves to hold the lower panel 77 in its closed position.

The lower panel or screen 77 is releasably connected to the combine 11 by two releasable latches 94, 96. These latches are shown in greater detail in FIGS. 6 and 7 wherein it will be noted that the spring latch element 97 has a bent end which extends into an opening 98 in an abutment part 99 welded to a bracket 101 which in turn is securely fastened to a side wall 102 of the combine frame 14. In a similar manner the latch 96 secured to a bracket 106 on the bottom panel or screen 77 has a spring latch element 107 with an end hooked in an opening 108 in abutment bracket 109 rigidly secured to the side wall 102. When the latches 94, 96 are released, the lower panel can be manually moved from its closed position, illustrated in solid lines in FIG. 2, to an open position illustrated by broken lines 111. In the open position shown by broken lines 111 in FIG. 2, it will be noted there will be no interference with the unloader tube 66 positioned alongside the upper panel 72. The unloader tube in its illustrated transport position as shown in FIG. 2 prevents the upper panel from being moved to its open position, however, when the unloader tube is swung upwardly to its bin unloading position, illustrated by broken lines 66' in FIG. 1, the upper panel upon release of its latch mechanism 113 can be swung to its open position, illustrated in FIG. 3, wherein the compressed gas linear actuator 86 has extended, as illustrated. Thus, the linear actuator 86 serves to maintain the lower panel in its closed position when in that position, serves to releasably maintain the lower panel in its open position when moved to that position and serves to releasably support the upper panel 72 in its open position as shown in FIG. 3.

The upper panel 72 of the side panel structure 71 is releasably held in its closed position by the latch mechanism 113 illustrated in FIGS. 2, 4 and 5. The latch mechanism includes a latch element in the form of a bracket 116 rigidly secured to the inboard side of the upper panel 72, which has a vertical opening 117 engaged by a downwardly extending finger part 118 of a movable latch element 119. The latch element 119 is pivotally connected to a bracket 121 by a pivot bolt 122 for vertical swinging movement about the horizontal longitudinal axis between its latch position, illustrated in FIGS. 2, 4 and 5, and in a release position, illustrated by broken lines 119' in FIG. 4, wherein finger 118 is disengaged from the opening 117 of latch elements 116. The latch element 119 is biased to its latching position by a tension spring 124 interconnected between the vehicle and the inboard end of the latch element 119. The counterclockwise rotation of the latch, as viewed in FIGS. 2 and 4, is limited by an abutment bolt 126 shown in abutting relation with the movable element 119 in FIGS. 2, 3, 4 and 5. The bracket 121 includes a horizontal guide slot 123 for receiving the latch element 116. When the lower panel 77 is in its closed position, as illustrated in FIG. 2, the movable latch element 119 is prevented from being moved to its release position by an interlock mechanism formed by a handle 128 welded at its upper end to the latch element 119 and an abutment wall 131 on the lower panel 77. A lower end 129 of the handle 126 abuts upon slight outward movement with the abutment wall 131 on the bracket 85 thereby preventing withdrawal of part 118 from opening 117. When the lower panel 77 is swung to its open position, the wall 131 is moved out of its confronting relation to the handle 128 and the operator may pull the lower end of the handle laterally outward to move the latch element 119 to its release position thereby releasing the upper panel 72 for swinging movement to its open position shown in FIG. 3.

In the version of the invention shown in FIG. 8, a modified upper panel 272 is used and the bracket 288 is somewhat longer than bracket 88 used in the FIG. 2 version of the invention. The pivot point 291 has been moved laterally outward to place the line of thrust 292 of the linear actuator 86 on the outboard side of the upper pivot axis 276 and, as a result, the actuator resiliently biases the upper panel 272 toward its illustrated closed position. Thus, in the FIG. 8 embodiment of the invention, the actuator 86 is operative to releasably maintain the upper panel in its closed position when placed there and in its open position when placed in that position. The actuator is also operative to releasably maintain the lower panel in its closed position when it is in that position and to releasably support the lower panel in its open position when it is placed in that position. It will be noted that if the lower panel is placed in its open position, it will remain in its open position relationship with the upper panel when the latter is moved from its closed position to its open position.

Upon opening the bifolding panel structure, there is access to the pulleys and belts disposed at the left-hand side of the combine on the inboard side of the panel structure. If access is only needed to lower belts or pulleys, the lower panel can be opened without moving the bin unloader tube from its transport position.

Figure 10:
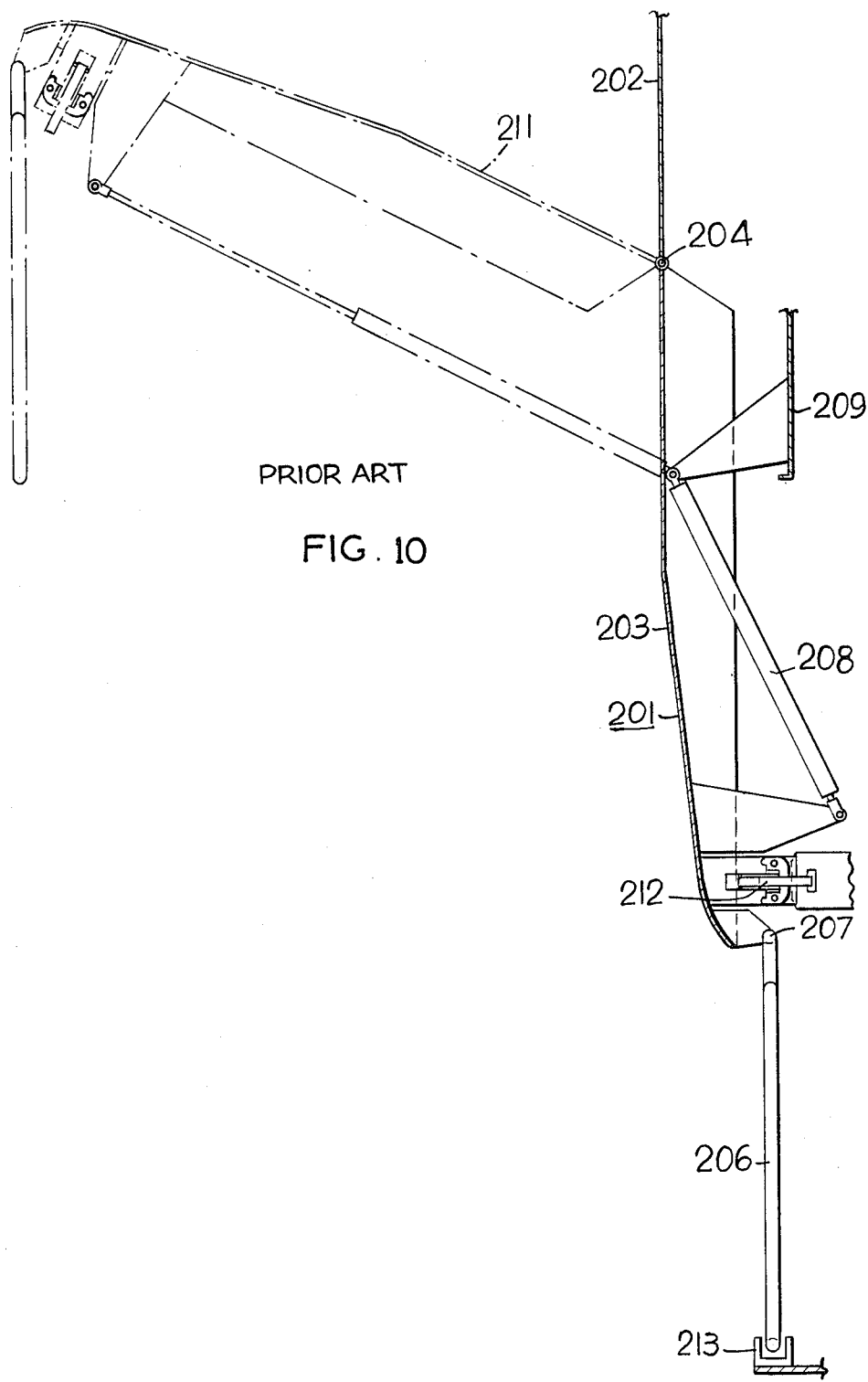
FIG. 10 is a view showing a prior art construction.

The prior art illustrated in FIG. 10 has been described at the beginning of this specification under the subheading "Prior Art."

The embodiments of the invention in which an exclusive property or privilege is claimed are defined as follows:

1. In combination with a vehicle, a bifolding side panel structure with inboard and outboard sides, comprising:
    a first upright panel having its upper end pivotally connected to said vehicle for swinging movement in an outboard direction about a first generally horizontal axis between a downwardly extending closed position and an open position wherein the lower end of said first panel is disposed outwardly away from said vehicle,
    a second upright panel having its upper end pivotally connected to said lower end of said first panel for relative swinging movement in one direction about a second generally horizontal axis between a closed position in which it extends downwardly from said first panel and an open position in angular relation to said first panel,
    a resilient linear actuator,
    pivot means pivotally connecting one end of said actuator to said vehicle at a first point spaced from said first axis, and
    pivot means pivotally connecting the other end of said actuator to said second panel at a second pivot point spaced from said second pivot axis to produce a line of thrust passing near said first axis and on the outboard side of said second axis when said panels are in their closed positions whereby said second panel is biased by said actuator toward its closed position,
    said second panel being manually swingable from its closed position to its open position wherein the pivot point between said second panel and said other end of said actuator is shifted to a position wherein the line of thrust of said actuator passes on the inboard side of said second axis whereby said second panel is biased toward its open position,
    said first panel being movable from its closed position to its open position wherein said actuator biases said first panel toward its open position.

2. The bifolding panel structure of claim 1 and further comprising means releasably maintaining said first panel in its closed position.

3. The bifolding panel structure of claim 2 wherein said means releasably maintaining said first panel in its closed position includes a latch mechanism including first and second latch elements mounted on said vehicle and said first panel, respectively, one of said latch elements being movable between a latch position in which it latchingly engages said other latch element to maintain said first panel in its closed position and a release position in which it is released from said other latch element.

4. The bifolding panel structure of claim 3 and further comprising interlock means preventing movement of said movable latch element from its latch position to its release position when said first and second panels are in their closed positions and permitting movement of said movable latch element to its release position when said second panel is moved from its closed position.

5. The bifolding panel structure of claim 4 and further comprising manually releasable latch means interposed between said second panel and said vehicle for releasably maintaining said second panel in its closed position.

6. The bifolding panel structure of claim 1 wherein said resilient linear actuator is a compressed gas actuator.

7. The bifolding panel structure of claim 1 wherein the line of thrust of said actuator passes on the outboard side of said first axis when said first panel is in its closed position.

8. The bifolding panel structure of claim 7 and further comprising a latching mechanism spaced below said first axis for releasably securing said first panel to said vehicle in said closed position of said first panel.

9. The bifolding panel structure of claim 8 wherein said latch mechanism includes a pair of cooperable latch elements on said first panel and vehicle, respectively, one of said latch elements being movable relative to the other of said latch elements between a latch position in which said latch elements are latched to restrain said first panel when the latter is in its closed position and a release position permitting swinging of said first panel from its closed position toward its open position.

10. The bifolding panel structure of claim 9 and further comprising interlock means preventing movement of said one latch element from its latch position to its release position when said panels are in their closed positions and permitting said one latch element to be moved to its release position when said second panel is moved from its closed position.

11. The bifolding panel structure of claim 1 wherein said vehicle is a self-propelled harvester including a grain bin and further comprising an unloading tube for unloading grain from said grain bin shiftable between a laterally outwardly extending unloading position and a longitudinally extending transport position alongside and on the outboard side of said panel structure in which it prevents movement of said first panel from its closed position to its open position and permits movement of said second panel from its closed position to its open position.

12. The bifolding panel structure of claim 11 wherein said harvester includes power transmitting belts and pulleys shielded by said panels when the latter are in their closed positions.

* * * * *